United States Patent [19]
dibenedetto

[11] Patent Number: 5,086,589
[45] Date of Patent: Feb. 11, 1992

[54] DOOR FOR VEHICLES AND METHOD FOR THE MAKING OF SAID DOOR

[75] Inventor: Giuseppe dibenedetto, Pogliano Milanese, Italy

[73] Assignee: Fiat Auto S.p.A., Turin, Italy

[21] Appl. No.: 627,721

[22] Filed: Dec. 14, 1990

[30] Foreign Application Priority Data

Dec. 15, 1989 [IT] Italy .................. 68101 A/89

[51] Int. Cl.⁵ .............................................. B60J 5/04
[52] U.S. Cl. ...................................... 49/502; 49/506; 296/146
[58] Field of Search ............... 49/502, 506; 296/146

[56] References Cited
U.S. PATENT DOCUMENTS 5,001,867  3/1991  Dupuy ...................... 49/502

Primary Examiner—Philip C. Kannan
Attorney, Agent, or Firm—Frost & Jacobs

[57] ABSTRACT

A vehicle door of the type comprising a window opening defined by a frame having a pair of posts and a cross-member, and a window glass for closing the window opening selectively movable between the window opening and an underlying accessory opening provided within the door; the frame presents an outer front surface provided with a channel-shaped cavity, and the window glass is mounted slidably in a perimeter strip rigid with a supporting element the shape of which mates with that of the channel-shaped cavity of the frame; the glass, the strip and the supporting element constituting a preassembled self-supporting unit which is fastened to the window frame by snap-hooking means housed within the channel-shaped cavity.

10 Claims, 2 Drawing Sheets

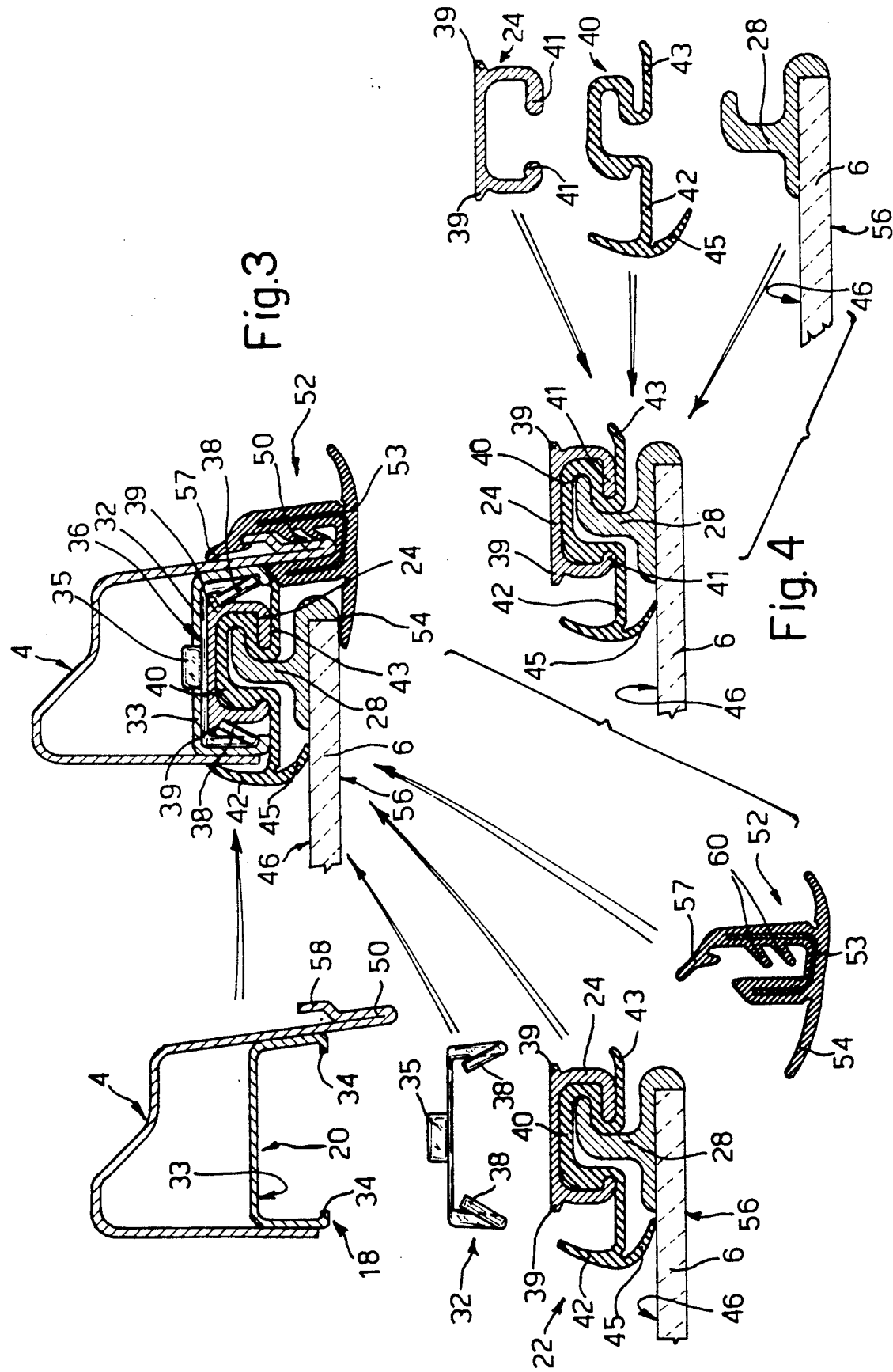

DOOR FOR VEHICLES AND METHOD FOR THE MAKING OF SAID DOOR

BACKGROUND OF THE INVENTION

The present invention relates to a vehicle door of the type comprising a window opening defined by a frame and a window glass for closing said window opening, selectively movable between the window opening and an underlying accessory opening provided within the door and positioned flush with the body when shut. Moreover, the invention relates to a method for making such a door.

The window glass of the aforedescribed type of well-known doors is supported slidable by the window frame, which can be provided rigid with the door framework or, preferably, as an independent element which is mounted on the door and fastened to it, for example, by means of screws. In both cases the mounting of the window glass proves to be complex and difficult, and the perimeter strip of the window as well as the strips of the door have to be made with very complex sections. Moreover, known constructions require that the window glass and the stop positions should be adjusted on the assembly line with all the drawbacks that this involves. Finally, known constructions are not completely suitable from the attractive point of view since the window guides and/or the fastening knobs of the window glass supporting shoes may remain in view.

SUMMARY OF THE INVENTION

The object of the present invention is to provide a door of simple and economical structure which permits the use of window glasses arranged flush with the vehicle body which may be quickly mounted without needing to adjust the window glass guiding means after the assembly.

Said object is attained according to the invention in that the window frame, which is defined by a pair of posts and by a cross member presents an external front surface provided with a channel-shaped cavity and in that the window glass is mounted slidable on a profiled supporting element the shape of which mates with that of the frame and forms, together with said window glass, a self-supporting unit, said profiled supporting element being housed within said channel-shaped cavity of the frame and being fastened to the frame by snap-hooking means.

Moreover the invention relates to a method for making a vehicle door, provided with a window opening closed by a window glass arranged flush with the body, characterized by comprising the following steps:

making a supporting framework comprising a window opening defining frame provided all along its length with a channel-shaped front cavity.

assembling, off the assembly line, a self-supporting unit consisting of a channel-shaped supporting element the profile of which mates with that of said window frame, a perimeter strip inserted within the profiled element and a window glass slidingly coupled with respective posts of the profiled element by means of respective guide shoes co-moulded with the glass;

snap-insertion of a plurality of small U-springs within the channel-shaped cavity of the window frame;

mounting of said self-supporting unit onto the frame and within an accessory opening underlying the frame by inserting said self-supporting unit through a communicating aperture between the accessory opening and the window opening; and locking of said self-supporting unit by snap-inserting the profiled element into said small U-springs.

BRIEF DESCRIPTION OF THE DRAWINGS

The invention will be more apparent from the non-limiting description of an embodiment thereof given hereinafter by way of example with reference to the accompanying drawings in which:

FIGS. 3 and 4 show, exploded and assembled, respective corresponding details of FIGS. 1 and 2, sectioned on the lines III—III and IV—IV.

DETAILED DESCRIPTION OF THE INVENTION

Figure 2:
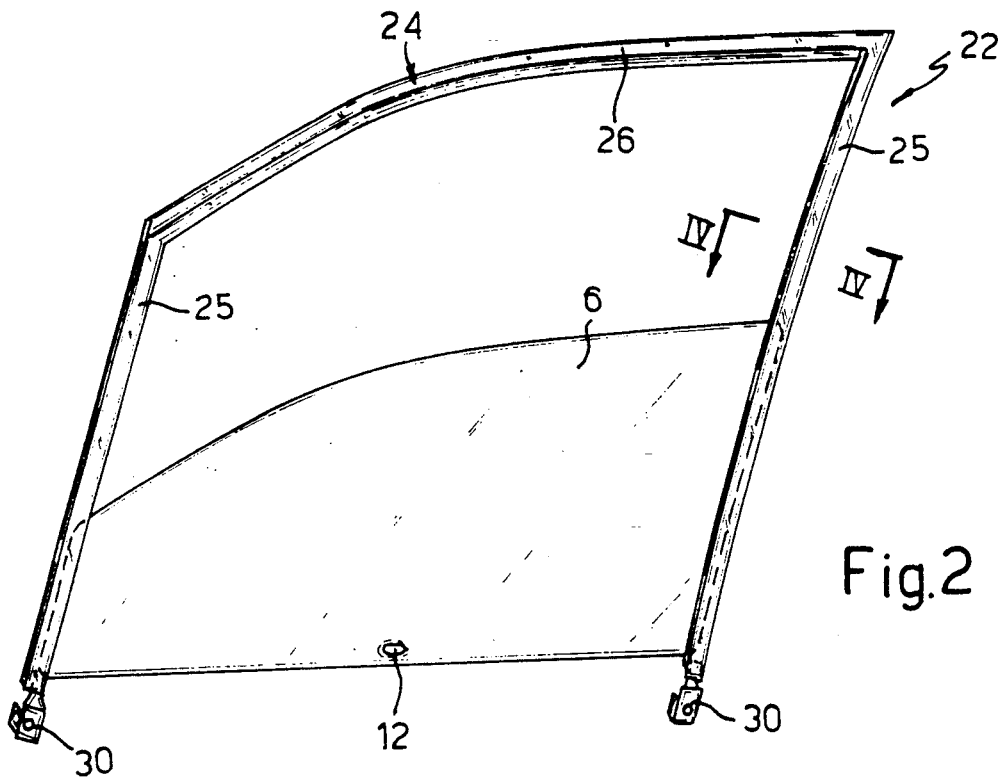
FIG. 2 is a front view of a subunit of the door of FIG. 1.
Figure 1:
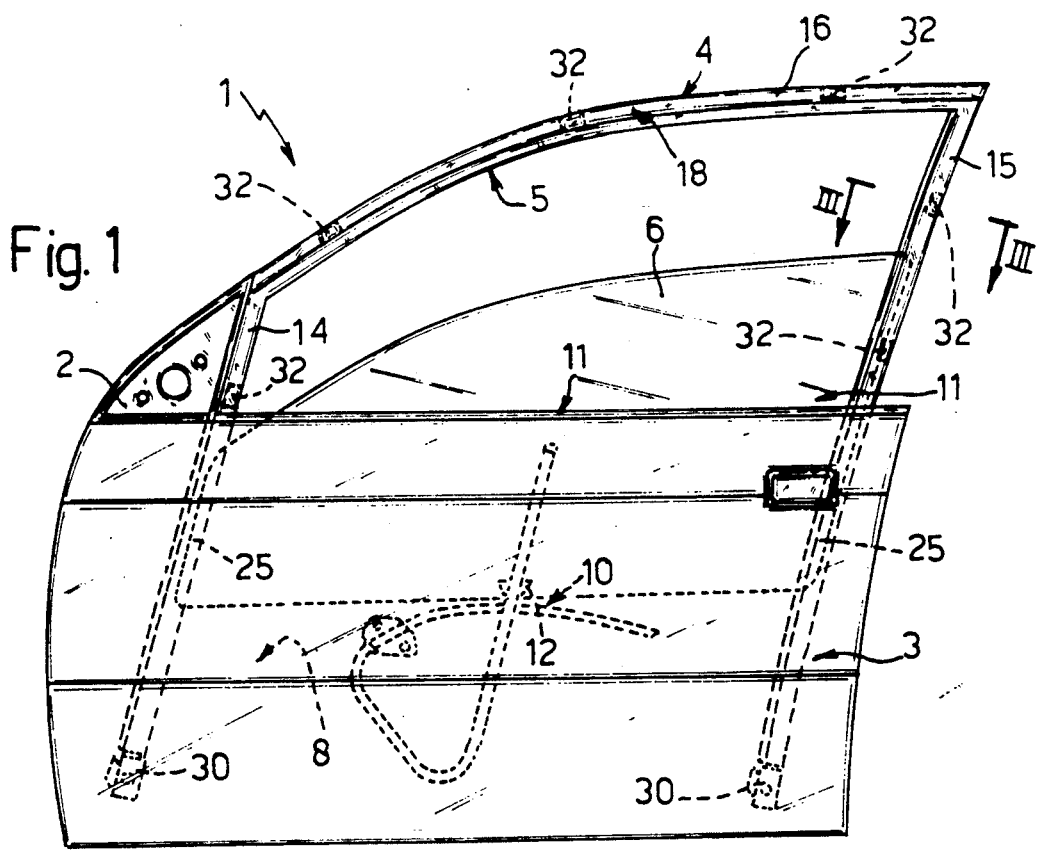
FIG. 1 is a front view of the door in accordance with the invention.

In FIGS. 1 and 2 the reference numeral 1 indicates overall a door for vehicles, in particular for a motor vehicle of any well-known type, which is not illustrated for simplicity, arranged to close and laterally define a passenger compartment of the aforesaid vehicle. The door 1 comprises a supporting framework 2 provided with an outer sheet panel 3 and a frame 4 defining a window opening 5 arranged to be closed by a window glass 6 supported by the framework 2 and selectively movable between the window opening 5 and an underlying accessory opening 8 provided within the door 1; the accessory opening 8 being arranged to contain said window glass 6 and, for example, a well-known window regulator 10, which communicates with the interior of the window opening 5 through an aperture 11 provided at the base of the window opening between the framework 2 and the outer panel 3, and through which the window glass 6 is movable. The window glass 6, at its bottom, is provided with a securing hole 12 for the window accessory 10. The frame 4, which is of overall inverted channel shape, comprises a pair of posts 14, 15 and an upper cross member 16.

According to the invention, the frame 4 is laterally defined on the exterior of the door 1 (with reference to the position of said passenger compartment) by a front surface 18 (FIG. 3) which is provided, all along the length of the frame 4, with a channel-shaped cavity 20 arranged to receive, together with the accessory opening 8, a preassembled self-supporting unit 22 (FIG. 2) comprising the window glass 6; in particular, the window glass 6 is mounted slidable on a substantially rigid supporting element 24 the shape of which mates with that of the frame 4 and is constituted, for example of an aluminum section in the form of an lengthwise channel so as to reproduce the profile of the frame 4. The element 24 also comprises a pair of posts 25, which can be coupled with the posts 14, 15, and an upper cross member 26 which can be coupled with the cross member 16. The glass 6 is slidingly coupled with the posts 25 by means of respective synthetic plastic L-shaped guide shoes 28 which are co-moulded on the window side edges of the glass 6 in a well-known manner.

The posts 25 are longer than the posts 14, 15 of the window frame 4 and therefore the element 24, being coupled with the frame 4, is partly housed within the accessory opening 8 through the communicating aperture 11. In order to ensure their attachment to the framework 2 and the frame 4 which is rigidly attached to the framework 2, the posts 25 are provided, at their respective lower extreme ends, with corresponding fastening brackets 30, which can be secured to the framework 2, as for example by means of well-known screws or bolts which are not illustrated for simplicity. The element 24 is dimensioned and profiled so that it can be housed within the channel-shaped cavity 20 of the frame 4. According to a further characteristic of the invention, there are provided snap-hooking means to fasten the frame 4 to the element 24 in a removable manner, once it has been coupled with the channel-shaped cavity 20. In the present case said snap-hooking means are directly housed within the channel-shaped cavity 20 and comprise a plurality of small U-springs 32 which are fixed between a bottom wall 33 of the cavity 20 and respective side edges 34 of said cavity (FIG. 3) the U-springs 32 being shaped so as to define respective front shoulders opposing the bottom wall 33. Each of the small U-springs 32 is provided with a locking rear element 35 which engages through the bottom wall 33 of the cavity 20 which is provided with suitable slots 36 cut at intervals with suitable pitch, so that they are held in the direction of the longitudinal extent of the cavity 20 as well.

The small U-springs 32, once mounted inside the cavity 20, are arranged to snap-receive the profiled element 24 and to lock it against the frame 4. Actually said small U-springs are provided at their opposite sides with resilient tongues 38 under which respective side projecting parts 39, provided at the rear of the profiled element 24, are arranged to be engaged. The profile element 24 (FIG. 4) is channel-shaped and houses a first perimeter strip 40 of uniform section which, therefore, is part of the preassembled self-supporting unit 22 as well. The strip 40 is snap-fixed within the profiled element 24 by two respective opposing side edges 41 of the element 24, bent to face into the interior of element 24, and is provided with oppositely directed laterally projecting lips 42 and 43 positioned for fluid-tight cooperation with the opposite sides of the frame 4. The lip 42 is L-shaped and has an oppositely directed cantilevered second lip 45 positioned for fluid-tight cooperation with the inner surface 46 of the window glass 6.

In order to ensure a perfect seal and drive of the window glass 6, the frame 4 is provided (FIG. 3), with a perimeter tongue 50 astride of which there is mounted a second perimeter strip 52 internally provided with a rigid U-shaped core 53 and provided with at least one cantilevered lip 54 arranged to slide-cooperate with an outer surface 56 of the window glass 6 to pack-tighten the latter together with the lip 45 of the strip 40. The locked-in position of the strip 52 on the tongue 50 is ensured by a rear lip 57 of said strip arranged to engage a raised rear edge 58 of the tongue 50 and also by transverse fixing lips 60 on the U-shaped strip 52.

The procedure for obtaining the above described door 1 is as follows. First, the self-supporting structure consisting of the frame 4 provided with the channel-shaped front cavity 20, the framework 2 and the outer skin which consists of the panel 3 is fabricated in a well-known manner through sheet metal pressing and welding. The frame 4 can be constructed separately and then mounted onto the framework 2, or it can be fabricated in the traditional way by the shiplapped jointing of suitably shaped parts of the framework 2 and the outer panel 3 (which, in this case, does not consist of a simple panel but of a more complex element formed by the accessory opening 8, door panel 3 and by a capping defining the front part of the frame 4). Simultaneously or successively, the assembly of the self-supporting unit 22 is carried out by first mounting the strip 40 into the supporting element 24 and, successively, by mounting the window glass 6 by insertion of the side guide-shoes 28, moulded on said window glass, into the strip 40. These operations can be performed with extreme ease and very quickly since the profiled supporting element 24 can be freely put in any suitable position and since no other elements impede access to the inside of the profiled element 24.

Finally, the self-supporting unit 22, already inspected and with the parts adjusted so as to ensure that the window glass 6 can slide freely without vibrations, is carried to the assembly line where it is coupled to the self-supporting structure of the door 1, consisting of the frame 4, the framework 2 and the panel 3 which were previously assembled, painted and possibly mounted on the vehicle body. The assembly of the self-supporting unit 22 is carried out as follow: first the small U-springs 32 are placed into the cavity 20 by inserting them with the elements 35 engaged in the slots 36; then the unit 22 is mounted by inserting, from the top, the posts 25 through the aperture 11 until the cross member 26 faces the cross member 16. At this point the frame 4, which has already received the small U-springs 32, is aligned opposite the upper part of the profiled element 24. Therefore it is sufficient to frontly squeeze the profiled element 24 into the channel-shaped cavity 20 so as to have it introduced into the cavity and subsequently locked on the fame 4 due to the snap-insertion of the projecting parts 39 under the tongues 38. Assembly is completed by locking the brackets 30, which are within the accessory opening 8, to the framework 2 and then connecting the glass 6 with the device 10. The parts defined by the framework 2 where the accessory opening 8 is located are readily accessible, the finishing panel having not yet been mounted.

The advantages of the invention are apparent from the aforegoing description. The adjustment of the glass 6 stop position can be performed off the line, during the assembly of the unit 22—assembly which is so very simple and quick that it can also be automated. On the other hand the aligning of the window frame 4 with the accessory opening 8 is directly performed during the construction of the self-supporting structure of the door 1 and, therefore, there are no parts to be adjusted on the line. The final assembly on the line is performed quickly and with simple movements (a vertical translation and a transverse thrust), therefore this operation also can be easily robotized. Finally, the door thus obtained is of good stiffness, the glass 6 is guided all along its trajectory between the window 5 and the accessory opening 8, thus preventing the glass from stopping or vibrating while the vehicle is running, and the unit 22 can be easily removed from the door 1 to simplify the handling operations since the small springs 32 enable the profiled element 24 to be removed.

What is claimed is:

1. A vehicle door of the type comprising a window opening defined by a frame having a pair of posts and a cross-member, an accessory opening in said door underlying said frame, and a window glass for said window opening selectively movable between said window opening and said underlying accessory opening, characterized in that said frame presents an outer front surface provided with a channel-shaped cavity and in that said window glass is slidably mounted on a profiled supporting element the shape of which mates with that of said frame and constitutes, together with said window glass, a self-supporting unit, said profiled supporting element being housed within said channel-shaped cavity of said frame and being fastened to said frame by snap-hooking means.

2. A door as claimed in claim 1, characterized in that said profiled element comprises a cross-member and a pair of posts, said pair of posts being longer than said window frame posts and being partly housed within said accessory opening through a communicating aperture at the base of said window opening between said accessory opening and said window opening.

3. A door as claimed in claim 2, characterized in that said posts of said profiled element are provided, at their lowermost ends, with securing means for attaching said profiled element to the framework of said door.

4. A door as claimed in claim 2, characterized in that said profiled supporting element is channel-shaped and has opposing inturned side edges, a first perimeter strip of uniform thickness snap-fixed in said profiled element by said inturned side edges of said profiled element, said first perimeter strip having laterally cantilevered opposing lips facing said frame and arranged for fluid-tight contact with said frame, and with another lip arranged for fluid-tight contact with an inner surface of said window glass.

5. A door as claimed in claim 4, characterized in that said frame is provided on its outer sides with a perimeter tongue astride which is mounted a second perimeter strip having a U-shaped core and a laterally cantilevered lip arranged to slide-cooperate with an outer surface of said window glass, said window glass being pack-tightened between said first and second strips and being guided between said posts of the profiled element by means of a pair of L-shaped side shoes.

6. A door as claimed in claim 1, characterized in that said snap-hooking means between said frame and said profiled supporting element are housed within said channel-shaped cavity of said frame and comprise a plurality of small U-springs fixed between a bottom wall and respective side edges of said channel-shaped cavity, said side edges being shaped so as to define respective front shoulders opposing said bottom wall, said small U-springs each being provided with a rear locking element extending through said bottom wall of said channel-shaped cavity.

7. A door as claimed in claim 6, characterized in that said small U-springs comprise resilient tongues under which rear side projecting parts of said profiled element are arranged to be engaged.

8. A method for making a vehicle door which comprises the steps of:
providing a door having a window opening defined by a frame having a pair of posts and a cross-member, said frame presenting an outer front surface provided with a channel-shaped cavity, an accessory opening in said door underlying said frame, and a communicating aperture in said door between said accessory opening and said window opening;
separately providing a preassembled self-supporting unit comprising a channel-shaped supporting element the profile of which mates with the channel-shaped cavity in said frame, said self-supporting element having a pair of posts and a cross-member, a perimeter strip mounted in the channel-shaped supporting element, and a window glass slidably coupled with the posts of said profiled element by means of guide shoes mounted on said window glass;
snap-inserting a plurality of U-springs within the channel-shaped cavity of said frame;
mounting said self-supporting unit on said frame by inserting said self-supporting unit through the communicating aperture between said accessory opening and said window opening, and aligning the posts and cross-member of the self-supporting unit with the posts and cross-member of said frame; and
locking said self-supporting unit to said door by snap-inserting said channel-shaped supporting element into said U-springs.

9. The method claimed in claim 8 including the step of fixedly securing the lowermost ends of the posts of said self-supporting unit to the interior of said door.

10. The method claimed in claim 8 including the step of attaching a second perimeter strip to said frame as an incident of assembling said door.

* * * * *